(12) United States Patent
Wakabayashi et al.

(10) Patent No.: US 10,762,737 B2
(45) Date of Patent: Sep. 1, 2020

(54) CASH PROCESSING SYSTEM

(71) Applicant: GLORY LTD., Himeji-shi, Hyogo (JP)

(72) Inventors: Nobumichi Wakabayashi, Hyogo (JP); Naoki Oka, Hyogo (JP)

(73) Assignee: GLORY LTD., Himeji-Shi, Hyogo (JP)

( * ) Notice: Subject to any disclaimer, the term of this patent is extended or adjusted under 35 U.S.C. 154(b) by 0 days.

(21) Appl. No.: 16/483,705

(22) PCT Filed: Jan. 12, 2018

(86) PCT No.: PCT/JP2018/000626
§ 371 (c)(1),
(2) Date: Aug. 5, 2019

(87) PCT Pub. No.: WO2018/146994
PCT Pub. Date: Aug. 16, 2018

(65) Prior Publication Data
US 2020/0027298 A1    Jan. 23, 2020

(30) Foreign Application Priority Data
Feb. 8, 2017 (JP) ................. 2017-021172

(51) Int. Cl.
*G07F 19/00* (2006.01)
*G07D 9/04* (2006.01)
(Continued)

(52) U.S. Cl.
CPC ............ *G07D 9/04* (2013.01); *G06F 8/65* (2013.01); *G06F 9/445* (2013.01); *G06Q 40/02* (2013.01); *G07F 19/203* (2013.01)

(58) Field of Classification Search
USPC ............................................... 235/379, 383
See application file for complete search history.

(56) References Cited

U.S. PATENT DOCUMENTS 8,255,581 B2 *   8/2012   Wee ................... G06F 3/0227
                                                 705/16

FOREIGN PATENT DOCUMENTS

JP     2002-197514 A    7/2002
JP     2003-051041 A    2/2003
(Continued)

OTHER PUBLICATIONS

International Searching Authority, "International Search Report," issued in connection with International Patent Application No. PCT/JP2018/000626, dated Apr. 3, 2018.
(Continued)

*Primary Examiner* — Jamara A Franklin
(74) *Attorney, Agent, or Firm* — Foley & Lardner LLP

(57) ABSTRACT

A cash processing system capable of diversified cash processes by means of a cash processor, and reducing calculator resources to achieve cost reduction. The cash processing system has a cash processor and a server connected to the cash processor through a network. The server provides an extension function program according to a download request from the cash processor. The cash processor includes: a first storage unit which stores a basic function program; a second storage unit which stores an extension function program; and a control unit which executes the basic function program and the extension function program. The control unit stores, according to the reception of a processing request which instructs the execution of the cash process, downloads, from the server, an extension function program that corresponds to the cash process included in the processing request, and stores the extension function program in the second storage unit.

8 Claims, 5 Drawing Sheets

(51) Int. Cl.
*G06F 8/65* (2018.01)
*G06F 9/445* (2018.01)
*G06Q 40/02* (2012.01)

(56) References Cited

FOREIGN PATENT DOCUMENTS

| | | |
|---|---|---|
| JP | 2003-177932 A | 6/2003 |
| JP | 2011-059835 A | 3/2011 |
| JP | 2014-038473 A | 2/2014 |

OTHER PUBLICATIONS

International Searching Authority, "Written Opinion," issued in connection with International Patent Application No. PCT/JP2018/000626, dated Apr. 3, 2018.

Nitta et al., "Object Oriented Software Development for Financial Application. Development Strategy and Outline," Information Processing Society of Japan, Chapter 4, Fig. 1, Sep. 4, 1996, pp. 1-259 to 1-260.

International Search Report dated Mar. 22, 2018 for corresponding Application No. PCT/JP2018/000626 (5 pages).

\* cited by examiner

CASH PROCESSING SYSTEM

RELATED APPLICATIONS

The present application claims priority under 37 U.S.C. § 371 to International Patent Application No. PCT/JP2018/000626, filed Jan. 12, 2018, which claims priority to and the benefit of Japanese Patent Application No. 2017-021172, filed on Feb. 8, 2017. The contents of these applications are hereby incorporated by reference in their entireties.

TECHNICAL FIELD

The present invention relates to a cash processing system installed at stores (for example, branches and/or sales offices) of a financial institution, such as a bank or a post office.

BACKGROUND ART

Typical stores of financial institutions are provided with a plurality of cash processing machines, such as a money management machine which manages cash in the store, an automatic teller machine (ATM) which a customer operates by himself/herself for, for example, cash deposit and withdrawal, a teller machine (TM) which receives and pays cash when a teller operates a teller terminal, and a money change machine which automatically performs money change. These cash processing machines are devices aimed at achieving a specific function: cash processing, and are called embedded devices. In particular, the cash processing machine is equipped with minimum pieces of hardware and software needed to achieve a specific function: cash processing.

In recent years, comprehensive specification implementation has become popular to meet the demand for higher performance of cash processing machines, and the related necessary computer resources (typically read only memory (ROM)) have increased. For example, cash processing machines used not only in Japan but in various parts in the world need to hold template data used for recognition of money denomination and authenticity and to hold cash processing programs for cash processing, for each country where they are used. They also need to hold cash processing programs for a plurality of diversified types of cash processing. For this reason, high-performance cash processing machine has a large-capacity storage apparatus.

CITATION LIST

Patent Literature

PTL 1
Japanese Patent Application Laid-Open No. 2003-051041
PTL 2
Japanese Patent Application Laid-Open No. 2014-038473

SUMMARY OF INVENTION

Technical Problem

However, some cash processing machines are provided with a function which is not used by customers. In this case, the waste of a computer resource may occur depending on the actual customer, and customers may have a complaint about the price of the product that increases with higher performance.

Meanwhile, PTLs 1 and 2 disclose a cash processing system in which a server provides template data and cash processing programs to cash processing machines via a network. With this cash processing system, addition and updates of template data and cash processing programs performed through the server are reflected to the cash processing machines, which brings efficiency to maintenance work. Further, cash processing machines can be provided with only template data and cash processing programs supported in the country where the system is used, thereby achieving a reduction in the amount of storage apparatus. Nevertheless, the cash processing machines still hold the cash processing programs for a plurality of diversified types of cash processing, and still implement functions not used depending on the customer.

An object of the present invention is to provide a cash processing system in which a plurality of diversified types of cash processing can be executed through a cash processing machine and needed computer resources are reduced so that a reduction in the cost of the cash processing machine can be achieved.

Solution to Problem

A cash processing system according to the present invention comprises: a cash processing machine capable of executing a plurality of types of cash processing; and a server to be connected to the cash processing machine via a network, wherein: the server comprises an extended function program providing section that provides any one of a plurality of extended function programs for executing the plurality of types of cash processing in accordance with a download request from the cash processing machine, the cash processing machine comprises: a first storage section that stores a basic function program for executing basic processing commonly needed to execute the plurality of types of cash processing; a second storage section that stores the extended function program; and a control section that executes the basic function program and the extended function program, wherein the control section downloads the extended function program corresponding to the cash processing included in a processing request from the server upon reception of the processing request designating execution of any one of the plurality of types of cash processing, and stores the extended function program in the second storage section.

Advantageous Effects of Invention

The present invention provides a cash processing system in which a plurality of diversified types of cash processing can be executed through a cash processing machine, and needed computer resources are reduced so that a reduction in the cost of the cash processing machine can be achieved.

DESCRIPTION OF EMBODIMENTS

An embodiment of the present invention will now be described in detail with reference to the accompanying drawings.

Figure 1:
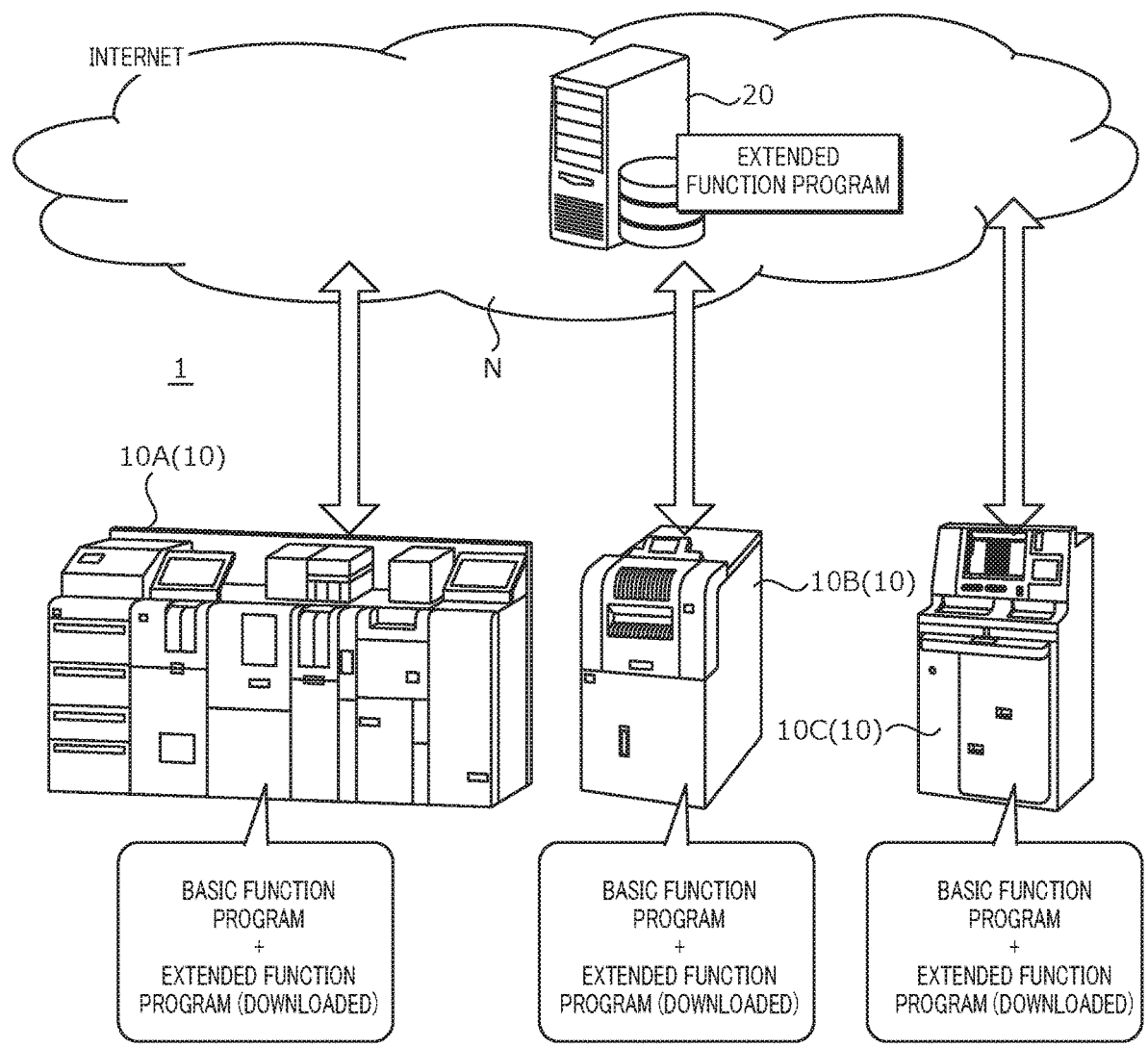
FIG. 1 is a diagram showing a cash processing system according to an embodiment.

FIG. 1 is a diagram showing a cash processing system 1 according to one embodiment of the present invention.

As shown in FIG. 1, the cash processing system 1 comprises a plurality of cash processing machines 10 and a server 20. The cash processing machines 10 and the server 20 are communicably connected via a network N. The cash processing system 1 is installed, for example, at a store of a financial institution such as a bank or a post office.

FIG. 1 shows an example of the cash processing machines 10: a money management machine 10A, a teller machine 10B, and a money change machine 10C. The network N is, for example, the Internet in which the cash processing machine 10 and the server 20 (so-called cloud server) are connected via a wide area communication network. A LAN including a plurality of cash processing machines 10 may be constructed, and may be connected to the wide area communication network via a gateway.

In the cash processing system 1, the server 20 is a service providing base for providing an extended function program to the cash processing machine 10, and the requested extended function program is provided to the cash processing machine 10 in response to a download request from the cash processing machine 10.

Figure 2:
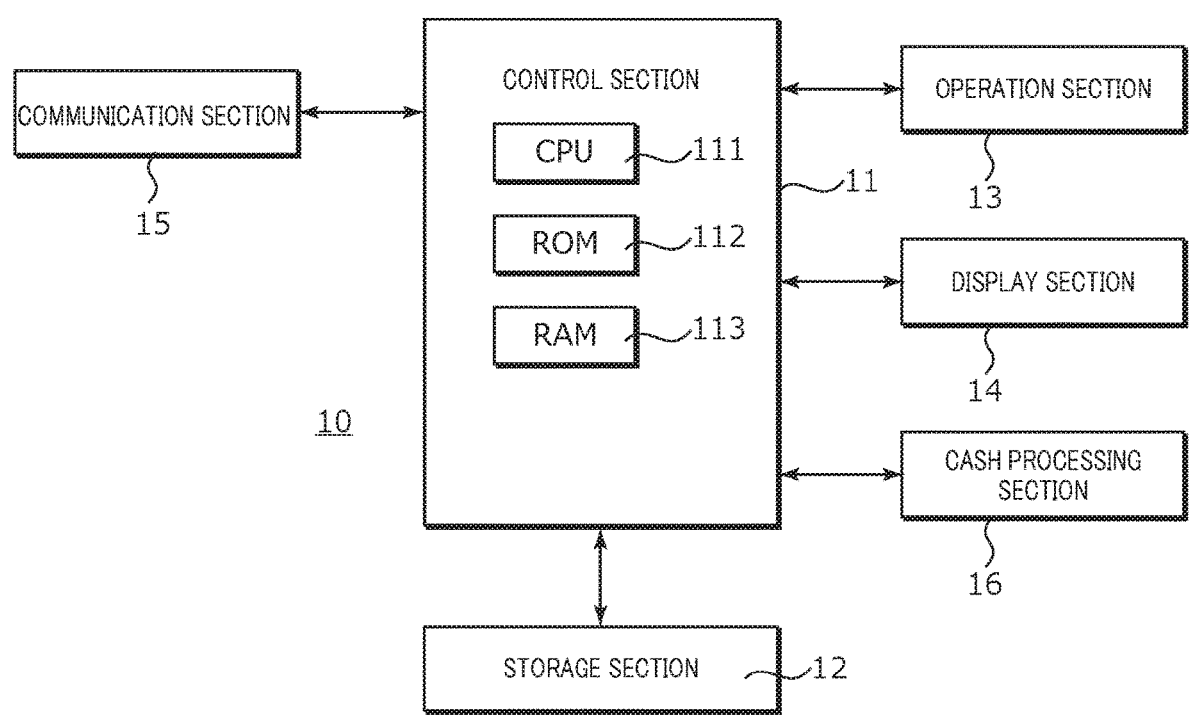
FIG. 2 is a diagram showing an example of the configuration of a cash processing machine.
Figure 3:
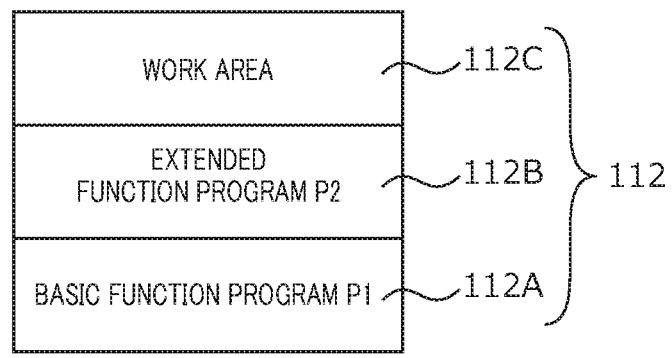
FIG. 3 is a diagram showing an example of a memory map in the cash processing machine.

FIG. 2 is a diagram showing an example of the configuration of a cash processing machine 10. FIG. 3 is a diagram showing an example of a memory map in the cash processing machine 10.

As shown in FIG. 2, the cash processing machine 10 comprises a control section 11, a storage section 12, an operation section 13, a display section 14, a communication section 15, a cash processing section 16, and the like.

The control section 11 comprises a central processing unit (CPU) 111 as an arithmetic/control apparatus, and a ROM 112 and a random access memory (RAM) 113 as main storage apparatuses.

The ROM 112 is a nonvolatile semiconductor memory (for example, an NOR flash memory), and can hold data even without power supplied. In the ROM 112, written data can be deleted block by block and new data can be written. The ROM 112 comprises a memory area 112A of a basic function program P1 (hereinafter referred to as "first storage section 112A"), a memory area 112B of an extended function program P2 (hereinafter referred to as "second storage section 112B"), and a work area 112C for storing data to be held (for example, an inventory amount, deposit and withdrawal history, and data of settings) (see FIG. 3).

The basic function program P1 is a program commonly required to execute the extended function program P2, and includes a control program for controlling a basic input output system (BIOS), an operating system (OS), a communication program, an actuator, and a sensor. The basic function program P1 may be a plurality of programs prepared for the respective functions, or an integral program. The basic function program P1 is fixedly held in the ROM 112. The "be fixedly held" refers to be held even while the power of the cash processing machine 10 is off. The basic function program P1 exclusively uses a predetermined memory area of the first storage section 112A. A location where the basic function program P1 is stored is given using an absolute address. Although the basic function program P1 is fixedly held in the ROM 112, the basic function program P1 can be updated by download from the server 20.

The extended function program P2 is a cash processing program for executing the designated cash processing (for example, deposit, withdrawal, accepting money, dispensing money, charging, and collection). The extended function program P2 is downloaded from the server 20 as needed and installed in the ROM 112. Namely, the extended function program P2 shares the second storage section 112B with another extended function program P2 in a time division manner. The holding status of the extended function program P2 in the second storage section 112B is stored in the ROM 112 as management information. The management information includes information indicating whether or not the extended function program P2 is installed in the second storage section 112B, information indicating cash processing corresponding to the installed extended function program P2, and information (for example, a hash value) for checking if the installed extended function program P2 is not damaged.

The RAM 113 is a volatile semiconductor memory (for example, a dynamic RAM or a static RAM) in which data is normally deleted when power supply is stopped. The RAM 113 has a work area used when the extended function program P2 is executed and a work area for temporarily storing counter data for each counting processing.

The CPU 111 reads a program appropriate for the content of the processing from the ROM 112 and loads it in the RAM 113, and performs central control on the operation of each block of the cash processing machine 10 by executing the loaded program.

The storage section 12 is an auxiliary storage apparatus such as a hard disk drive (HDD) or a solid state drive (SSD). The storage section 12 may be a disk drive that drives an optical disk, such as a compact disc (CD) or a digital versatile disc (DVD), or a magneto-optical disk (MO) or the like, to read and write information. Alternatively, the storage section 12 may be, for example, a memory card, such as a USB memory or an SD card.

The operation section 13 is, for example, a keyboard with which characters and numbers can be input or a pointing device, such as a mouse. The display section 14 is a display, such as a liquid crystal display or an organic EL display, that displays information necessary for cash deposit and withdrawal in the cash processing machine 10. The operation section 13 and the display section 14 may be composed of a flat panel display with a touch screen.

The communication section 15 is, for example, a communication interface, such as a network interface card (NIC), a modulator-demodulator (MODEM), or a universal serial bus (USB). The control section 11 transmits and receives various types of information to and from the server 20 connected to the network N via the communication section 15. A communication interface for near field wireless communication, such as near field communication (NFC) or Bluetooth (registered trademark) can also be applied to the communication section 15.

The cash processing section 16 is a unit for depositing or withdrawing money. For example, in the case of the money management machine 10A, the cash processing section 16 comprises a new series note withdrawing section, a bound notes withdrawing section, a loose notes depositing and withdrawing section, a coin-roll withdrawing section, and a loose coins depositing and withdrawing section. In addition, the cash processing section 16 comprises a recognition and counting section that counts while recognizing deposited money or withdrawn money.

The operator inputs a processing request for causing the cash processing machine 10 to execute desired cash processing through the operation section 13. In the cash processing machine 10, the control section 11 executes the extended function program P2 corresponding to the cash processing included in the processing request, thereby performing desired cash processing. At this time, the extended function program P2 corresponding to the cash processing included in the processing request is downloaded from the server 20 as appropriate and installed in the ROM 112.

Figure 4:
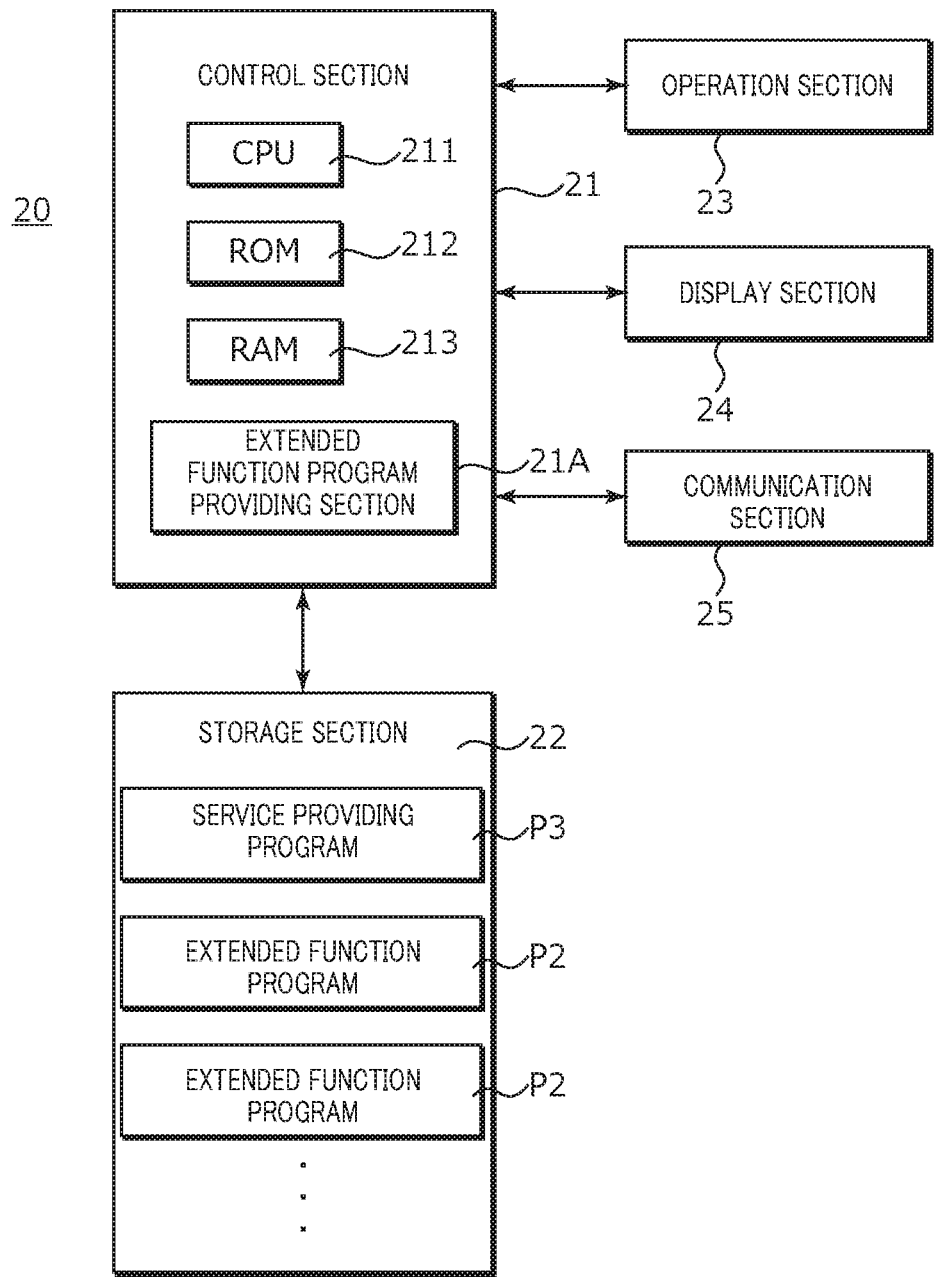
FIG. 4 is a diagram showing an example of the configuration of a server.

FIG. 4 is a diagram showing an example of the configuration of the server 20.

As illustrated in FIG. 4, the server 20 is a general-purpose computer comprising a control section 21, a storage section 22, an operation unit 23, a display section 24, and a communication section 25. The basic configuration of each block is the same as that of the cash processing machine 10, and their detailed description will therefore be omitted.

The control section 21 comprises a CPU 211, a ROM 212, and a RAM 213. For example, the CPU 211 reads a program corresponding to the content of the processing from the ROM 212 or the storage section 22 and loads the program in the RAM 213, executes the loaded program, and performs central control on the operation of each block of the server 20.

The storage section 22 is, for example, an auxiliary storage apparatus such as an HDD. The storage section 22 stores, for example, a service providing program P3 for processing the download request from the cash processing machine 10 and an extended function program P2 provided to the cash processing machine 10. The extended function program P2 is prepared for each type of cash processing machine 10 and for each type of cash processing. Further, in the case where a special specification is requested by a financial institution in which the cash processing machine 10 is installed, the extended function program P2 includes a custom-made program prepared for the cash processing machine 10 of the financial institution.

The operation unit 23 and the display section 24 are used at the time of the maintenance of the server 20, such as the update of the service providing program P3 or the extended function program P2.

The communication section 25 is a communication interface for communication with external devices. The control section 21 transmits and receives various types of information to and from the cash processing machine 10 connected to the network N via the communication section 25.

In the server 20, the control section 21 functions as an extended function program providing section 21A by executing the service providing program P3. In response to the download request from the cash processing machine 10, the extended function program providing section 21A provides any of the plurality of extended function programs P2. The function of the extended function program providing section 21A will be described in detail with reference to the sequence diagram of FIG. 5.

Figure 5:
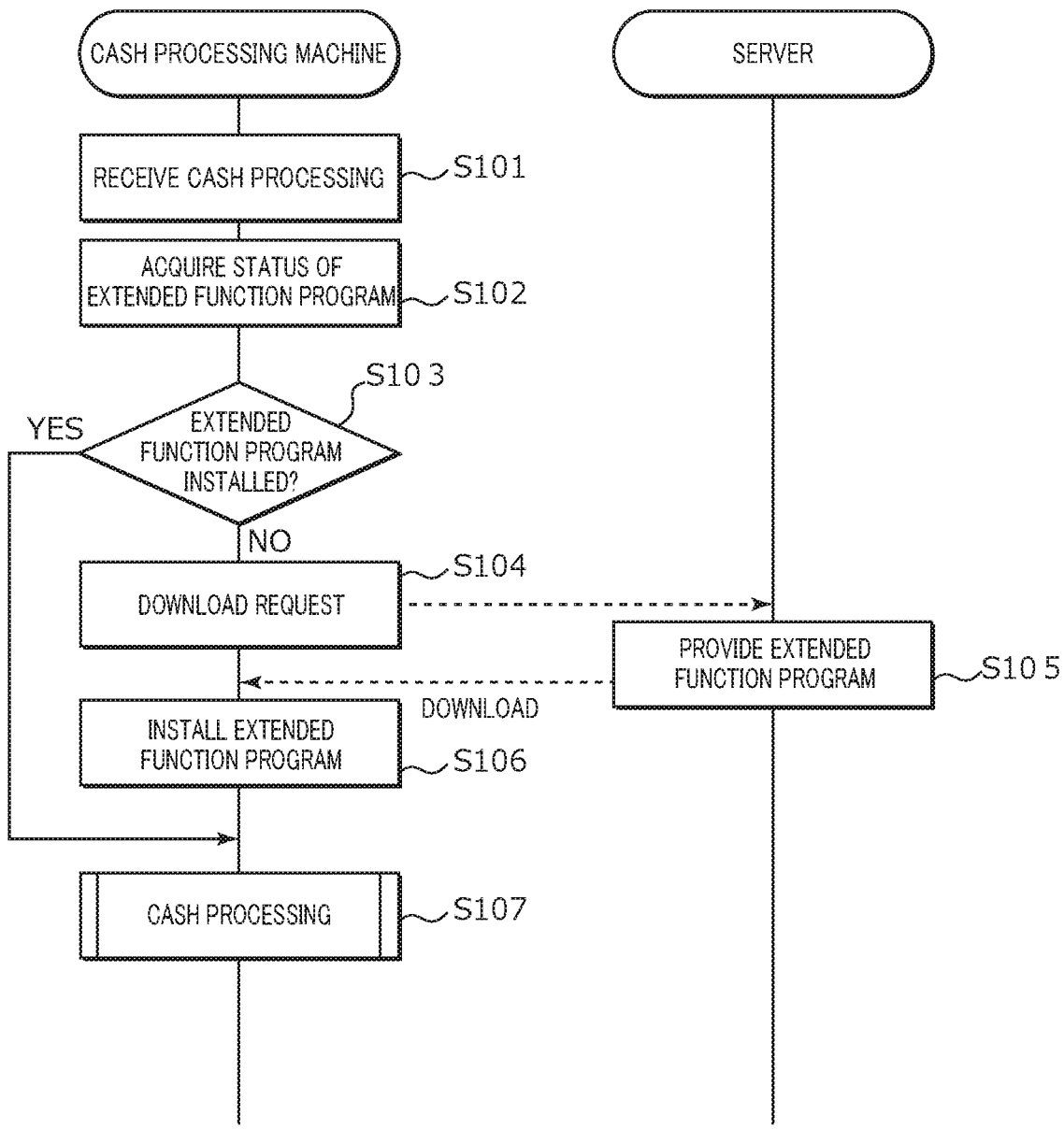
FIG. 5 is a sequence diagram showing one example of cash processing executed in the cash processing system.

FIG. 5 is a sequence diagram showing an example of cash processing performed by the cash processing system 1. In the server 20, the control section 21 executes the service providing program P3. When powered on, the cash processing machine 10 performs initialization processing and updates management information including the holding status of the extended function program P2 in the second storage section 112B. The processing in the cash processing machine 10 is executed by the control section 11.

In Step S101, the cash processing machine 10 receives a processing request designating the execution of the cash processing performed by the operator through the operation section 13.

In Step S102, the cash processing machine 10 acquires the status (management information) of the extended function program P2 installed in the ROM 112. The ROM 112 holds, for example, the extended function program P2 corresponding to the cash processing that was executed last time.

In Step S103, the cash processing machine 10 determines whether or not the extended function program P2 corresponding to the cash processing included in the processing request is installed in the ROM 112. If the extended function program P2 corresponding to the cash processing included in the processing request is installed in the ROM 112 ("YES" in Step S103), the process proceeds to Step S107. If the extended function program P2 corresponding to the cash processing included in the processing request is not installed in the ROM 112 ("NO" in Step S103), the process proceeds to Step S104.

When the extended function program P2 corresponding to the cash processing included in the processing request is held in the second storage section 112B (see FIG. 3), the extended function program P2 is not downloaded from the server 20. Thus, the time that elapses before the cash processing can be shortened. In this case, the cash processing machine 10 may inquire of the server 20 about whether or not the extended function program P2 has been updated. If there has been the update, the extended function program P2 is downloaded. If there has been no update, the extended function program P2 is not downloaded.

In Step S104, the cash processing machine 10 transmits, to the server 20, a download request for the extended function program P2 corresponding to the designated cash processing. The download request includes, for example, information indicating the type of cash processing, information on the cash processing machine 10 (for example, the model of the cash processing machine 10, serial No., and hardware information), information on a customer who operates the cash processing machine 10 (here, a financial institution) (for example, recognition information on the financial institution), and information on an operator (for example, an operator ID).

When another extended function program is installed in the ROM 112, the existing extended function program P2 is deleted to install the extended function program P2 corresponding to the processing request. If there is space in the second storage section 112B, that is, if the extended function program P2 corresponding to the cash processing included in the processing request can be installed without deleting the existing extended function program P2, the existing extended function program P2 is not necessarily deleted and may be held.

When a plurality of other extended function programs P2 is installed in the ROM 112, it is preferable that the existing plurality of extended function programs P2 be deleted in ascending order of usage frequency.

In Step S105, the server 20 provides the requested extended function program P2 in response to the download request from the cash processing machine 10 (processing related to the extended function program providing section 21A). To be specific, the server 20 selects one of the plurality of extended function programs P2 held in the storage section 22 on the basis of the information indicating the type of cash processing included in the download request and information on the cash processing machine 10, and provides it to the cash processing machine 10.

At this time, the server 20 may determine the authority of the operator on the basis of information on the operator included in the download request (for example, recognition information on the operator), and may determine whether or not the download is possible. The data for matching of the information on the operator is stored, for example, in the storage section 22. If the operator who issued the processing request does not have a proper authority, the download is not permitted, and the cash processing machine 10 is notified of that fact.

In Step S106, the cash processing machine 10 downloads the extended function program provided by the server 20 and installs it in the ROM 112.

In Step S107, the cash processing machine 10 performs the designated cash processing by executing the extended function program P2 corresponding to the cash processing included in the processing request. Upon reception of a processing request designating the execution of cash processing in Step S101, if the corresponding extended function program P2 is already installed, this extended function program P2 is executed. In contrast, if the corresponding extended function program P2 is not installed in the ROM 112, the extended function program P2 provided from the server 20 is installed in the ROM 112 and executed in response to the download request.

An object pointing to each processing module of the basic function program P1 (for example, a pointer to a function) is held in a data structure such as a table assigned to a fixed address. At the time of execution, the extended function program P2 refers to this data structure to call desired processing from each processing module of the basic function program P1. Hence, the designated cash processing is performed.

After the cash processing ends, the extended function program P2 installed in the ROM 112 may be deleted in preparation for the next cash processing to be designated, but preferably remains held. If the next designated cash processing is the cash processing corresponding to the extended function program P2, that cash processing is executed without another download, so the processing time can be made shorter than when another download is performed.

Further, when the extended function program P2 installed in the ROM 112 is the program corresponding to cash processing for which the processing authority is required, it is preferable that the extended function program P2 be deleted upon the completion of the cash processing. Cash processing for which the processing authority is requested includes withdrawal processing for a large amount, for example, over 5,000,000 yen.

As described above, the cash processing system 1 comprises the cash processing machine 10 capable of executing a plurality of types of cash processing, and the server 20 connected to the cash processing machine 10 via the network N. The server 20 comprises an extended function program providing section 21A that provides any one of the plurality of extended function programs P2 for executing the respective types of cash processing in response to a download request from the cash processing machine 10. The cash processing machine 10 comprises a first storage section 112A that stores a basic function program P1 for executing basic processing commonly necessary to execute a plurality of types of cash processing, a second storage section 112B that stores an extended function program P2, and a control section 11 that executes the basic function program P1 and the extended function program P2. The control section 11 downloads the extended function program P2 corresponding to the cash processing included in the processing request from the server 20 upon reception of the processing request designating the execution of any one of the plurality of types of cash processing, and stores it in the second storage section 112B.

In other words, for functions that are not required to operate at the same time, that is, cash processing achieved using an extended function program P2, the cash processing machine 10 does not fixedly hold the corresponding extended function program P2 in the ROM 112 but downloads and executes it on demand. As a result, the cash processing machine 10 can execute a plurality of diversified types of cash processing, and can suppress the usage of the memory area as a computer resource. In other words, the restricted computer resources in the cash processing machine 10 which is an embedded device can be effectively used. Consequently, with the cash processing system 1, there can be provided a cash processing system in which a plurality of diversified types of cash processing can be executed with a cash processing machine, and needed computer resources are reduced, which contributes to a reduction in the cost of the cash processing machine 10.

Further, with the cash processing system 1, when a function related to cash processing in the cash processing machine 10 is added or changed, updating only the extended function program P2 held by the server 20 can add or change the function for all the cash processing machines 10 under operation in the market. As software maintenance work is centralized, the efficiency of maintenance work is significantly improved.

As mentioned above, although the invention made by the present inventor was concretely explained based on an embodiment, the present invention is not limited to the above-mentioned embodiment and can be changed without departing from the scope of the present invention.

For example, although the extended function program P2 is installed in the ROM 112 in the case described in the embodiment, it may be installed in the RAM 113. In this case, when the cash processing machine 10 is powered off, the extended function program P2 is automatically deleted. The data of the RAM 113 may be retained even if the cash processing machine 10 is powered off by, for example, supplying power to the RAM 113 using a static RAM and a battery (so-called battery backup).

For example, the RAM 113 or the storage section 12 may be used as a second storage section for storing an extended function program P2. When the storage section 12 is used as a second storage section, the extended function program P2 is transferred to the RAM 113 using a function such as a file system and then is executed.

The ROM 112 and the RAM 113 may be used as a second storage section for storing an extended function program P2. In this case, the download destination (installation destination) is set according to the content of the cash processing included in the processing request. For example, frequently used extended function programs P2 (for example, deposit processing and withdrawal processing) are installed in the ROM 112, and less frequently used extended function programs P2 (for example, charge processing and collection processing) are installed in the RAM 113.

In the embodiment, the network N may be a LAN.

In the embodiment, in the server 20, the control section 21 executes a service providing program P3 and functions as the extended function program providing section 21A so that the present invention can be achieved; however, this function can also be configured using an electronic circuit, such as a digital signal processor (DSP), an application specific integrated circuit (ASIC), or a programmable logic device (PLD).

It should be construed that the embodiments disclosed here are only examples in all respects, and are not limitational. The scope of the present invention is not represented by the above description but is indicated by the appended claims instead, and is intended to include all modifications equivalent to the claims and within the scope of the claims.

The disclosure of the specification, accompanying drawings, and abstract included in Japanese Patent Application No. 2017-021172 filed on Feb. 8, 2017 is incorporated in this application by reference.

REFERENCE SIGNS LIST

1 Cash processing system
10 Cash processing machine
11 Control section
111 CPU
112 ROM
112A First storage section
112B Second storage section
20 Server
21 Control section
21A Extended function program providing section
P1 Basic function program
P2 Extended function program

The invention claimed is:

1. A cash processing system, comprising:
a cash processing machine configured to execute a plurality of types of cash processing; and
a server to be connected to the cash processing machine via a network, wherein:
the server comprises
a computer configured to provide at least one of a plurality of extended function programs for executing the plurality of types of cash processing in accordance with a download request from the cash processing machine, and
the cash processing machine comprises:
a first storage configured to store a basic function program for executing basic processing commonly needed to execute the plurality of types of cash processing;
a second storage configured to stores the extended function program; and
a circuitry configured to execute the basic function program and the extended function program, wherein
the circuitry is configured to download the extended function program corresponding to the cash processing included in a processing request from the server upon reception of the processing request designating execution of any one of the plurality of types of cash processing, to store the extended function program in the second storage, and to execute the cash processing included in the processing request by executing both the basic function program and the extended function program.

2. The cash processing system according to claim 1, wherein, when the extended function program corresponding to the cash processing included in the processing request is held in the second storage, the circuitry does not download the extended function program from the server.

3. The cash processing system according to claim 1, wherein, in a case where the extended function program corresponding to the cash processing included in the processing request is held in the second storage, the circuitry inquires of the server about whether or not the extended function program has been updated, and in a case where the extended function program has been updated, the circuitry downloads the extended function program, whereas the circuitry does not download the extended function program in a case where the extended function program has not been updated.

4. The cash processing system according to claim 1, wherein
the cash processing machine is installed in a plurality of financial institutions, and
the server provides the extended function program for the financial institution based on recognition information on the financial institution included in a download request from the cash processing machine.

5. The cash processing system according to claim 1, wherein
the second storage is a nonvolatile memory, and
the extended function programs stored in the second storage are deleted in ascending order of usage frequency.

6. The cash processing system according to claim 1, wherein the second storage comprises a nonvolatile memory and a volatile memory, and a download destination is set in accordance with content of the cash processing corresponding to the extended function program.

7. The cash processing system according to claim 1, wherein
the second storage is a nonvolatile memory, and
in a case where the extended function program is a program corresponding to the cash processing with processing authority requested, the extended function program is deleted upon completion of the cash processing.

8. The cash processing system according to claim 1, wherein, on a basis of recognition information on an operator included in a download request from the cash processing machine, the server determines authority of the operator and determines whether or not the download is allowed.

* * * * *